United States Patent
Yamamoto et al.

(10) Patent No.: US 9,395,594 B2
(45) Date of Patent: Jul. 19, 2016

(54) ELECTROCHROMIC ELEMENT, METHOD FOR DRIVING THE SAME, AND OPTICAL FILTER

(71) Applicant: CANON KABUSHIKI KAISHA, Tokyo (JP)

(72) Inventors: Jun Yamamoto, Tokyo (JP); Kazuya Miyazaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 133 days.

(21) Appl. No.: 14/107,755

(22) Filed: Dec. 16, 2013

(65) Prior Publication Data
US 2014/0168746 A1 Jun. 19, 2014

(30) Foreign Application Priority Data

Dec. 17, 2012 (JP) ................................. 2012-274538
Oct. 9, 2013 (JP) ................................. 2013-212294

(51) Int. Cl.
| | |
|---|---|
| *G02F 1/153* | (2006.01) |
| *G02F 1/155* | (2006.01) |
| *G02F 1/01* | (2006.01) |
| *G02B 5/00* | (2006.01) |
| *G02B 5/23* | (2006.01) |
| *G02F 1/15* | (2006.01) |

(52) U.S. Cl.
CPC ................. *G02F 1/155* (2013.01); *G02B 5/003* (2013.01); *G02B 5/23* (2013.01); *G02F 1/0128* (2013.01); *G02F 2001/1515* (2013.01)

(58) Field of Classification Search
CPC ..... G02F 1/155; G02F 1/1523; G02F 1/1525; G02F 1/133514; G02F 1/15; G02F 2001/1519; G02F 2001/1552
USPC ........................................... 359/237, 265–275
See application file for complete search history.

(56) References Cited

U.S. PATENT DOCUMENTS

| 5,580,784 A | * | 12/1996 | Berndt | ........................ | 435/288.7 |
| 2009/0052006 A1 | * | 2/2009 | Xu et al. | ........................ | 359/275 |
| 2011/0267680 A1 | * | 11/2011 | Aschwanden | ................ | 359/315 |

FOREIGN PATENT DOCUMENTS

JP 51-146253 A 12/1976

OTHER PUBLICATIONS

Michael G. Hill, etal., "Oligothiophene Cation Radicals . . . ", Chem. Mater., 1992, 4, pp. 1106-1113.

* cited by examiner

*Primary Examiner* — Mahidere Sahle
(74) *Attorney, Agent, or Firm* — Canon U.S.A., Inc., IP Division

(57) ABSTRACT

Provided is an electrochromic element having: a pair of electrodes; an electrochromic layer which is provided between the pair of electrodes and has an electrolyte and an electrochromic material; and a spacer which surrounds a periphery of the electrochromic layer, the element having a change mechanism that changes a thickness of the electrochromic layer.

13 Claims, 11 Drawing Sheets

TRANSMITTED LIGHT

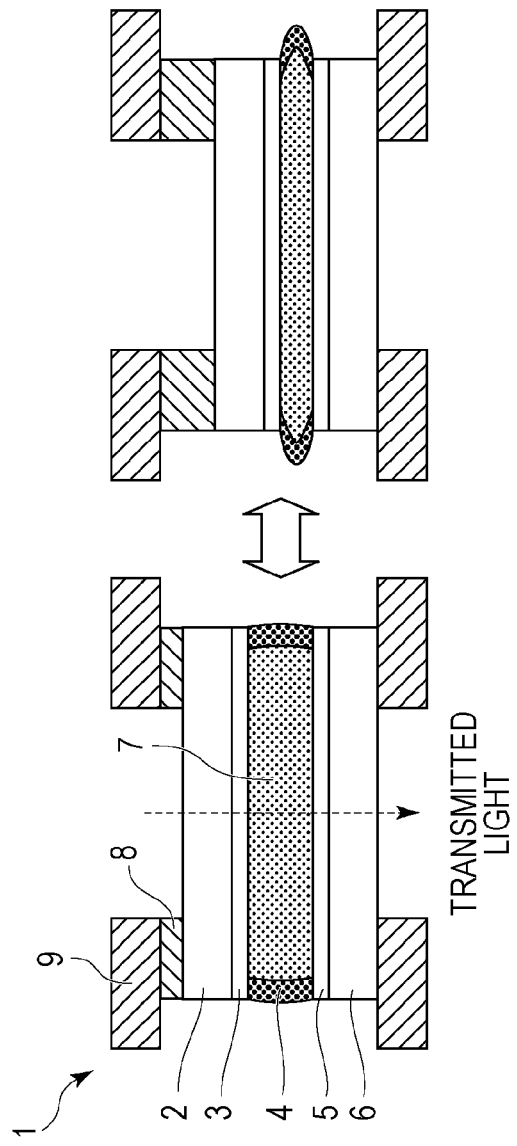

US 9,395,594 B2

ELECTROCHROMIC ELEMENT, METHOD FOR DRIVING THE SAME, AND OPTICAL FILTER

BACKGROUND OF THE INVENTION

1. Field of the Invention

The present invention relates to an electrochromic element and an optical filter, and particularly relates to an organic electrochromic element provided with a mechanism for controlling an optical path length, a method for driving the same, and an optical filter using the same.

2. Description of the Related Art

An electrochromic (EC) phenomenon is a phenomenon that an optical absorption region of a material changes as induced by a reversible electrochemical reaction (oxidation reaction or reduction reaction) which occurs upon application of a voltage, leading to coloration or decoloration of the material. An electrochemical coloring/decoloring element using such an electrochromic phenomenon is called an electrochromic element, and expected to be applied as a light modulating element for changing a light transmittance.

As an EC material, there are known one using a metal oxide such as $WO_3$ and one using a conductive polymer. In Japanese Patent Application Laid-Open No. 51-146253, an EC element using an organic low-molecular material such as viologen is described. Among such elements, an organic EC element which colors/decolors a low-molecular organic material in a solution state is known to have an advantage of obtaining a sufficient contrast ratio in a colored state while obtaining a high transmittance in a decolored state.

The low-molecular organic EC material in the solution form has absorption in a visible light region by coloration, and one material generally has one or two absorption peaks in the visible light region. For this reason, color control is performed by mixing a plurality of materials having different absorption.

When the organic EC element is used as the light modulating element, a color scale (gradation) needs to be controlled. The gradation is set based upon an electrochemical reaction amount of the organic EC material, and the reaction amount is generally adjusted by electric control (applied voltage).

Further, in Chem. Mater., 1992, 4, pp. 1106-1113, a material which changes an absorption spectrum in the process of coloration by an oxidation reaction is reported.

The electrochromic element described in Japanese Patent Application Laid-Open No. 51-146253 is an element which controls a transmittance of an EC material by application of a voltage. It is described that controlling a voltage to be applied to the element leads to control of the electrochemical reaction of the EC material and control of its transmittance.

However, there are cases where just controlling the electrochemical reaction cannot lead to sufficient control of a light transmittance of the element.

The present invention was made in view of such a background, and provides an electrochromic element capable of controlling a light transmittance by changing a distance between electrodes of the electrochromic element, a method for driving the electrochromic element, and an optical filter.

SUMMARY OF THE INVENTION

Accordingly, the present invention provides an electrochromic element having: a pair of electrodes; an electrochromic layer which is provided between the pair of electrodes and has an electrolyte and an electrochromic material; and a spacer which surrounds a periphery of the electrochromic layer, the element having a change mechanism which changes a thickness of the electrochromic layer.

An optical filter for solving the above problem has: the above electrochromic element; and an active element connected to the electrochromic element.

A method for driving an electrochromic element to solve the above problem is a method for driving an electrochromic element having a pair of electrodes, and an electrochromic layer which has an electrolyte and an electrochromic material between the pair of electrodes, the element having a change mechanism which changes a distance between the pair of electrodes, wherein a thickness of the electrochromic layer is changed by the change mechanism, to change a transmittance of the electrochromic element.

While examples of the electrochromic element (abbreviated as "EC element") according to the present invention may include one using an inorganic material as an electrochromic material (abbreviated as "EC material") and one using an organic material as the EC material, an organic electrochromic element (abbreviated to as "organic EC element") using an organic material as the EC material is particularly preferred.

Further features of the present invention will become apparent from the following description of exemplary embodiments (with reference to the attached drawings)

BRIEF DESCRIPTION OF THE DRAWINGS

FIGS. 3A and 3B are schematic views showing a mechanism of a spacer in the organic EC element of the present invention;

FIG. 11 is a schematic view showing an image pickup apparatus which has the optical filter of the present invention built-in.

DESCRIPTION OF THE EMBODIMENTS

The present invention is an electrochromic element having: a pair of electrodes; an electrochromic layer which is provided between the pair of electrodes and has an electrolyte and an electrochromic material; and a flexible member which is arranged between the pair of electrodes.

It is characterized in that the element has a change mechanism which changes a thickness of the electrochromic layer.

While examples of the electrochromic element (abbreviated as "EC element") according to the present invention may include one using an inorganic material as an electrochromic material (abbreviated as "EC material") and one using an organic material as the EC material, an organic electrochromic element (abbreviated to as "organic EC element") using an organic material as the EC material is particularly preferred.

The flexible member is preferably provided so as to surround a periphery of the electrochromic layer.

Further, a method for driving an electrochromic element according to the present invention is a method for driving an electrochromic element having a pair of electrodes, and an electrochromic layer which has an electrolyte and an electrochromic material between the pair of electrodes, the element having a change mechanism which changes a distance between the pair of electrodes. It is characterized in that a thickness of the electrochromic layer is changed by the change mechanism, to change a transmittance of the electrochromic element. It is preferable that the distance between the pair of electrodes be repeatedly varied by the change mechanism with a frequency of not less than 10 Hz.

Hereinafter, embodiments of the present invention will be described in detail by use of the drawings.

Figure 1:
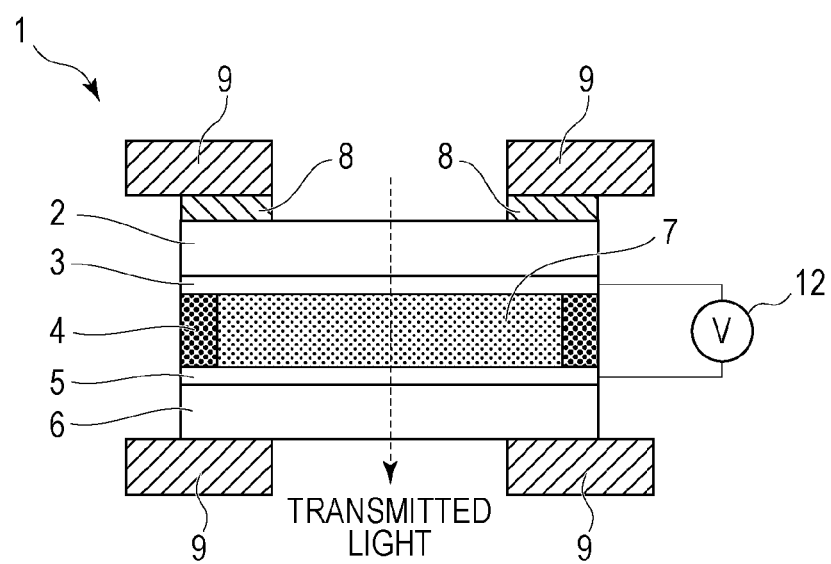
FIG. 1 is a schematic view showing an embodiment of an organic EC element of the present invention.

FIG. 1 is a schematic view showing an embodiment of the organic EC element of the present invention. As shown in FIG. 1, the organic EC element of the present invention is configured by bonding a pair of transparent substrates 2, 6, formed with a pair of transparent electrodes 3, 5 such that the electrode surfaces are opposed to each other through a spacer 4. It is a structure where an organic EC layer 7, obtained by dissolving an electrolyte and an organic EC material in a solvent, exists in an air gap formed by the pair of transparent electrodes 3, 5 and the spacer 4. The organic EC element 1 is fixed by a support 9. A change mechanism 8 exists between the support 9 and the transparent substrate.

The transparent electrodes 3, 5 are connected to an external power source 12, and by application of a voltage to between the two electrodes, an electrochemical reaction occurs in the organic EC material.

The organic EC material is in a neutral state in a no-voltage-applied condition, and does not have absorption in a visible light region. The organic EC element shows a high transmittance in such a decolored state. By application of the voltage to between the two electrodes, the electrochemical reaction occurs in the organic EC material, and the state thereof becomes an oxidation state or a reduction state from the neutral state. The organic EC material comes to have absorption in the visible light region in the oxidation/reduction state, to be colored. In such a colored state, the organic EC element shows a low transmittance.

Hereinafter, assuming as the organic EC material a material which forms cations from neutral species by an oxidation reaction so as to be colored, transmittance control will be described.

The transmittance of the organic EC element follows the Lambert-Beer law shown in Formula (1) below:

[Mathematical Formula 1]

$$-\mathrm{Log}(T/100) = OD = \in \cdot c \cdot L \quad \text{Formula (1)}$$

In Formula (1), T is a transmittance (%), OD is an optical density, $\in$ is a molar absorbance coefficient of cations, c is a concentration of produced cations, and L is an optical path length.

As seen from Formula (1), the transmittance of the organic EC element is adjusted by the concentration of the cations. Further, the concentration of the cations is adjusted by the electrochemical reaction.

In the electrochemical reaction, when the state of the material shifts between the neutral state and the cation state, by application of a more positive (larger) potential than a potential in the material itself which is required for oxidation (oxidation potential), the material is oxidized from the neutral state, to come into the cation state. On the other hand, by application of a more negative (smaller) potential than a reduction potential, the material comes back into to the neutral state from the cation state.

The oxidation potential and the reduction potential show a difference of about 60 mV in ideal conditions of a room temperature and a one-electron reaction. In particular, one-half of a sum of the oxidation potential and the reduction potential is called a redox potential. In the electrochemical reaction, the larger potential the oxidation potential of the material is applied, the more the oxidation reaction proceeds. Since a kinetic equilibrium is changed by the potential, the concentration of the cations can be appropriately adjusted in an experiential manner by means of a magnitude of the oxidation potential. That is, by adjusting the magnitude of the voltage to be applied, the concentration of the cations can be adjusted, so as to adjust an amount of change in transmittance.

On the other hand, when the concentration of the cations is used as a control factor, problems would be that a halftone tends to change in a material which forms a dimer as in Chem. Mater., 1992, 4, pp. 1106-1113, and that in the case of mixing a plurality of materials, it becomes difficult to control the concentration of the cations due to a difference in oxidation potential of each material.

Accordingly, in the present invention, not the concentration c of the cations but the optical path length L is used as the control factor. As obvious from Formula (1), in the state of the concentration c of the cations, the transmittance can be controlled by changing the optical path length L. Particularly in the present invention, the gradation is controlled by means of the optical path length of the organic EC element, thus allowing the halftone to be held without greatly varying a shape of an absorption spectrum, namely an intensity ratio of absorption, in the colored state. Therefore, in the present invention, the optical path length L is changed by changing the thickness of the EC layer.

The change mechanism 8 is operated/transformed, to control a space between the transparent substrates (optical path length). The support 9 is fixed to the outside and immovable, and it transmits pressure by motion of the change mechanism 8 to the transparent substrate.

Since the EC element according to the present invention is capable of changing its transmittance by changing the distance between the electrodes, a material for changing the absorption spectrum in the process of coloration by the oxidation reaction can be used for the material unit as disclosed in Chem. Mater., 1992, 4, pp. 1106-1113.

In the case of controlling the transmittance only by the electrochemical reaction, it may become difficult to control gradation in an intermediate state (halftone) due to such a material where two generated radical species form a dimer.

Further, when a plurality of materials is mixed, each material has a different oxidation potential, thus causing a difference in colored state of each material depending on the applied voltage. When the applied voltage is made large for expressing dark gradation, the potential exceeds the oxidation potential in every material and coloration occurs, but when the applied voltage is made small for expressing bright gradation, there are considered cases where the potential exceeds the oxidation potential and coloration occurs in some materials whereas the potential does not exceed the oxidation potential and coloration does not occur in some other materials.

For this reason, in the case of using a plurality of materials, it is suitable to use a material that does not form a dimer or a material with a uniform oxidation potential, but the use of such a material causes significant reduction in choice of the material.

That is, even when the EC element according to the present invention is an EC element having an electrochromic layer with a plurality of kinds of EC materials, the gradation in the intermediate state can be appropriately expressed.

An optical filter according to the present invention has the above electrochromic element and an active element connected to the electrochromic element.

In the present embodiment, examples of the active element are electronic parts which drive and control the EC element. For such electronic parts, for example, a transistor and an MIM element may be included. Examples of the transistor may include, as an activation layer, monocrystalline silicon, non-single-crystalline silicon such as amorphous silicon and microcrystalline silicon, and semiconductors of non-single-crystalline oxide such as indium zinc oxide and indium gallium zinc oxide. The transistor may be a thin film transistor. The thin film transistor is also called a TFT element. Electronic parts controlling the drive of the EC element such as a relay or an analog switch of various methods are included.

The optical filter may be used in an image pickup apparatus such as a camera. When used in the image pickup apparatus, the optical filter may be provided in a body of the image pickup apparatus or in its lens unit.

The image pickup apparatus according to the present embodiment has the optical filter and a light receiving element for receiving light having passed through this optical filter.

The lens unit according to the present embodiment has the optical filter and an optical system with a plurality of lenses. Light having passed through this optical filter may pass through the plurality of lenses, or light having passed through the plurality of lenses may pass through this optical filter.

EXEMPLARY EMBODIMENTS

Hereinafter, embodiments of the present invention will be described in detail with reference to the drawings.

Exemplary Embodiment 1

FIG. 1 is a view schematically showing an embodiment of the organic EC element of the present invention. Further, it is a schematic view showing gradation of the organic EC element of the present invention.

As shown in FIG. 1, the organic EC element 1 of the present invention has a structure where a pair of transparent substrates 2, 6, formed with a pair of transparent electrodes 3, 5, are bonded to each other such that the electrode surfaces are opposed to each other through the spacer 4 which is a flexible member, and the organic EC layer 7, obtained by dissolving an electrolyte and an organic EC material in a solvent, exists in an air gap formed by the pair of transparent electrodes 3, 5 and the spacer 4.

The organic EC element 1 is fixed by the support 9. The change mechanism 8 is provided on the transparent substrate formed on the outside of at least one electrode, and a distance between the pair of electrodes is changed by the change mechanism, to change the thickness of the EC layer 7. In FIG. 1, the change mechanism 8 exists in at least part of a space between the support 9 and the transparent substrate.

The transparent electrodes 3, 5 are connected to an external power source 12, and by application of a voltage to between the two electrodes, an electrochemical reaction occurs in the organic EC material.

Figure 2A:
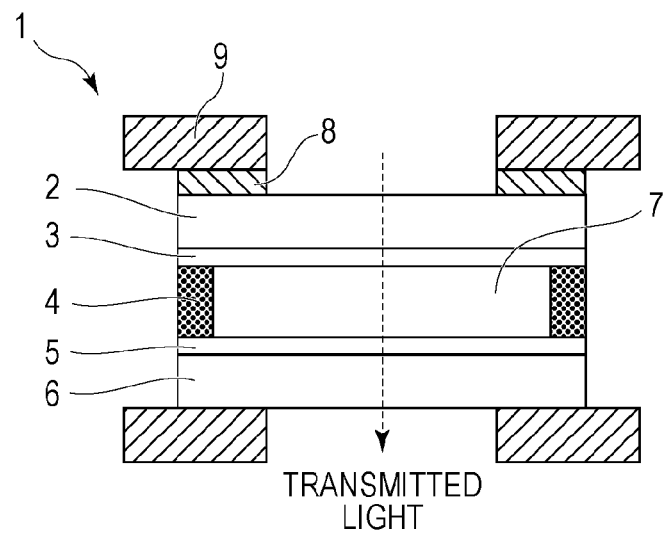
FIGS. 2A to 2C are schematic views showing gradation of the organic EC element of the present invention.
Figure 2B:
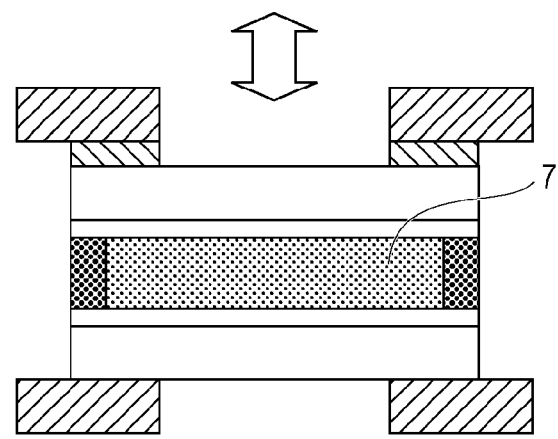
Figure 2C:
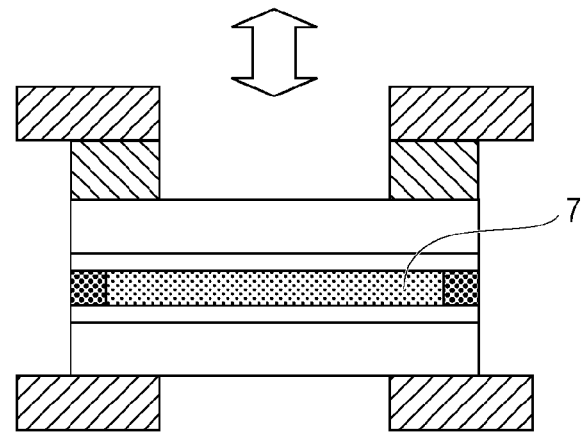

FIGS. 2A to 2C schematically show drive of the organic EC element of the present embodiment. FIG. 2A is a schematic view showing a decolored state, FIG. 2B is a schematic view showing a colored state, and FIG. 2C is a schematic view showing a halftone between FIGS. 2A and 2B. The organic EC element comes into the decolored state of FIG. 2A when no voltage is applied. It shows a high transmittance since the organic EC material is not colored and absorption associated with coloration does not occur in the visible light region. The state becomes the colored state of FIG. 2B from the decolored state when a voltage is applied and the organic EC material is oxidized and colored. FIG. 2B shows a state where the oxidation reaction has sufficiently occurred and the organic EC layer is colored throughout its thickness direction. Since absorption occurs in the visible light region, the transmittance decreases. A contrast ratio can be made greatly high depending on a manner for setting a concentration of the organic EC material or the optical path length. FIG. 2C is a state where, from the state of FIG. 2B, the motion of the change mechanism 8 has made the distance between the transparent electrodes smaller, the thickness of the organic EC layer 7 smaller, and the optical path length smaller. With only the optical path length changed from the color state formed in FIG. 2B, the halftone can be displayed without greatly disturbing an absorption spectrum. Further, by controlling the thickness of the organic EC layer 7, higher gradation can be displayed by fine control of the optical path length. By changing the thickness of the organic EC layer, the light transmittance of the organic EC element can be controlled.

In the case of using the organic EC element as a light modulating element, in order to make the gradation high, it is preferable to hold a high transmittance in the decolored state. Hence it is more preferable to use a material, which sufficiently passes visible light therethrough, for the transparent substrate and the transparent electrode.

It is preferable to use the transparent substrate as the substrate. A glass member is used for the transparent substrates 2, 6, and an optical glass substrate such as Corning code 7059 glass or BK-7 glass can be suitably used.

Further, as for a material of plastic, ceramic or the like, one can be appropriately used so long as having transparency. With the transparent substrate directly receiving force from the change mechanism, a material which is rigid and tends not to be distorted is preferred. Moreover, it is preferably less flexible as the substrate. A thickness of the transparent substrate is from several tens of μm to several mm.

The transparent electrode is preferably used as the electrode. A material having high light transparency in the visible light region and having high conductivity is preferable for the transparent electrodes 3, 5. Examples of these materials may include: metals and metal oxides such as indium tin zinc oxide alloy (ITO), tin oxide (NESA), indium zinc oxide (IZO), silver oxide, vanadium oxide, molybdenum oxide, gold, silver, platinum, copper, indium and chrome; silicon materials such as polycrystalline silicon and amorphous silicon, and carbon materials such as carbon black, graphite and glassy carbon.

Further, conductive polymers whose conductivities have been improved by doping treatment or the like (e.g., polyaniline, polypyrrole, polythiophene, polyacetylene, polyparaphenylene and complexes of polystyrene sulfonic acid with polyethylenedioxythiophene (PEDOT), etc.) are also suitably used.

In the organic EC element of the present invention, since it is preferable to have a high conductivity in the decolored state, ITO, IZO and NESA which do not show light absorption in the visible light region, and the conductive polymers with improved conductivities are particularly preferably used. These can be used in a variety of forms such as a bulk form and a fine-particle form. It is to be noted that these electrode materials may be used singly or in combination.

The spacer 4 adjusts the space between the electrodes of the organic EC element, thereby to adjust the thickness of the EC layer. The spacer is a flexible member. The spacer 4 is arranged so as to surround an outer periphery while avoiding a portion of the electrode which becomes an optical path.

In such a case, the spacer 4 may also serve as a seal member such that a solution containing the organic EC material is not leaked to the outside. Further, in a use where the nonuniformity in amount of transmitted light on the electrode surface does not matter, the spacer 4 may be arranged in the portion of the electrode which becomes the optical path.

FIGS. 3A and 3B are schematic views showing a mechanism of the spacer in the organic EC element of the present invention. FIGS. 3A and 3B show an example of a specific motion of the spacer 4. In accordance with a change in space between the electrodes by the motion of the change mechanism 8, the spacer 4 bends or shrinks by itself, to be transformed. Examples of the transformation of the spacer 4 may include: being transformed in a compressing direction from a regular position and then returning to the original position; being transformed in an extending direction from the regular position and then returning to the original position; and being transformed both in the compressing/extending directions and then returning to the original position.

As shown in FIG. 3B, when the space between the electrodes becomes smaller and the thickness of the EC layer becomes smaller, the solution runs into a space on the outer periphery generated by the transformation of the spacer. As shown in FIG. 3A, when the space between the electrodes returns to the original one, the solution also comes back into the original state along with the spacer. By the transformation of the spacer, the space between the electrodes and the thickness of the EC layer can be changed even when a volume of the solution is fixed.

The spacer is preferably has elasticity so as to follow the change in space between the electrodes. Further, the spacer preferably has flexibility. Moreover, it preferably has resistance to a solution dissolved with the organic EC material.

Examples of a suitable material for the spacer may include a variety of rubber materials such as natural rubber, isoprene rubber, butadiene rubber, styrene-butadiene rubber, butyl rubber, nitrile rubber, ethylene-propylene rubber, chloroprene rubber, acrylic rubber, chlorosulfonated polyethylene rubber, urethane rubber, silicone rubber, fluorine rubber, ethylene-vinyl acetate rubber, and epichlorohydrin rubber.

Further, the material may be one that itself has rigidity but shows elasticity by being configured as a structural body like bellows. As a specific structural example, one that has a structure being bent with two sides shaped like "<" and changing an angle between the two sides with respect to transmission of force.

Examples of a material with such a structure may include resin materials such as a variety of general-purpose plastic, engineering plastic and super engineering plastic which are known. The examples may include a variety of ceramic materials such as glass, alumina, zirconia, ferrite, forsterite, zircon, steatite, aluminum nitride, silicon nitride and silicon carbide. Moreover, the examples may include a variety of metal materials.

The organic EC layer 7 is made up of one obtained by dissolving the electrolyte and the organic EC material in a solvent.

The solvent is not particularly restricted so long as being one that can dissolve the electrolyte, but one having polarity is particularly preferred. Specific examples thereof may include water and organic polar mediums such as methanol, ethanol, propylene carbonate, ethylene carbonate, dimethyl sulfoxide, dimethoxyethane, acetonitrile, γ-butyrolactone, γ-valerolactone, sulfolane, dimethylformamide, dimethoxyethane, tetrahydrofuran, acetonitrile, propione nitrile, dimethylacetamide, methylpyrrolidinone and dioxolane.

The electrolyte is not particularly restricted so long as being an ion-dissociable salt as well as a salt having favorable solubility and containing cations or anions with electron donating properties to the extent that coloration of the organic EC material can be ensured. Examples thereof may include inorganic ion salts such as alkali metal salt and alkaline earth metal salt, quaternary ammonium salts and annular quaternary ammonium salts.

Specific examples thereof may include LiClO4, LiSCN, LiBF4, LiAsF6, LiCF3SO3, LiPF6, LiI, NaI, NaSCN, NaClO4, NaBF4, NaAsF6, KSCN, KCl as alkali metal salts of Li, Na and K and the like, and (CH3)4NBF4, (C2H5)4NBF4, (n-C4H9)4NBF4, (C2H5)4NBr, (C2H5)4NClO4 and (n-C4H9)4NClO4 as quaternary ammonium salts and annular quaternary ammonium salts. These electrolyte materials may be used singly or in combination.

Further, any material may be used for the organic EC material so long as it has solubility to the solvent and can express coloration and decoloration by the electrochemical reaction.

A known oxidation/reduction colorable EC material can be used. When the organic EC element is used as the light modulating element, transmittance contrast and wavelength planarity are required. With these taken into consideration, it is preferable to use as the organic EC material a material having as high a transmittance as possible in the decolored state and having as high coloration efficiency (ratio of an optical density to an injected electric charge) as possible. Further, in terms of the wavelength planarity, a plurality of materials may be used in combination when plane absorption is difficult to realize by use of one material.

As specific examples of the organic EC material, there can be used organic dyes such as viologen dye, styryl dye, fluoran dye, cyanine dye and aromatic amine dye, organic metal complexes such as metal-bipyridyl complex and metal-phthalocyanine complex, and the like.

Further, one obtained by dispersing an inorganic EC material in a solution can also be used. Examples of the inorganic EC material may include tungsten oxide, vanadium oxide, molybdenum oxide, iridium oxide, nickel oxide, manganese oxide and titanium oxide.

The organic EC layer 7 is preferably a liquid or gel. The organic EC layer 7 is suitably used in a solution state made up of the above, but can also be used in a gel state. For gelation, the solution is made to further contain a polymer or a gelling agent. The above polymer (gelling agent) is not particularly restricted, and examples thereof may include polyacrylonitrile, carboxymethyl cellulose, polyvinyl chloride, polyvinyl bromide, polyethylene oxide, polypropylene oxide, polyurethane, polyacrylate, polymethacrylate, polyamide, polyacrylamide, polyester, polyvinylidene difluoride and Nafion. As thus described, viscous one, gelled one or the like can be used as the organic EC layer 7.

Other than being used in the mixed state as described above, these solutions may be carried on a structural body having a transparent and flexible mesh structure (e.g., spongy one).

The change mechanism 8 is a mechanism for controlling the optical path length as the thickness of the EC layer. The change mechanism 8 is arranged in at least part of the space between the support 9 and the transparent substrate, and provided with a mechanism for transmitting force to the transparent substrate side by taking a portion connected to the support 9 as a fulcrum. By the change mechanism transmitting pressing or pulling force to the transparent substrate, the space between the electrodes is controlled, to control the thickness of the organic EC layer. Performing the above motion from the colored state allows expression of the halftone.

As such a change mechanism 8, there can be used a variety of actuators such as electric/hydraulic/pneumatic mechanical actuators.

Further, there can also be used an actuator which, as a material, shows shrinking transformation with respect to electric conduction (voltage application). Specific examples thereof may include one that is polarized with an electric field to change its crystal structure so as to bring about distortion, like a piezoelectric-type actuator. The examples may also include one in which ions migrate with the electric field to lead to a volume change so as to bring about distortion, like an ionic migration-type polymer actuator, and one that generates electrostatic force with the electric field so as to bring about distortion, like a dielectric elastomer-type polymer actuator. The examples may also include one that changes a molecular orientation with the electric field so as to bring about distortion, like a liquid crystal-type actuator, and one whose crystal structure is phase-transformed associated with heat generation (temperature change) by electric conduction so as to bring about distortion, like a shape memory alloy.

The examples may also include one that is thermally expanded associated with heat generation by electric conduction so as to bring about distortion, like bimetal and a heat-driven actuator. The examples may also include one that absorbs and releases a solvent such as moisture with respect to an input of an electric stimulus so as to bring about distortion, like hydrogel.

The examples may also include one that absorbs and releases hydrogen with respect to a temperature region so as to bring about distortion, like a hydrogen absorbing alloy material, and ones in a variety of forms. Any actuator is sufficiently usable in the present invention unless its size or response speed is restricted.

Among those, the piezoelectric-type actuator is particularly preferred as being capable of performing high-speed and precise control. Since the piezoelectric-type actuator has a small extension/shrinkage amount of a material and thus has a sufficient displacement amount, it is preferably used in the form of making a bending motion in a unimorph/bimorph shape.

Further, the polymer actuator is also preferred since it has a large amount and large generation force of extension/shrinkage of the material itself and can thus be made smaller in size. If electric insulation against a high voltage can be ensured, the dielectric elastomer-type polymer actuator is more preferred as being operated at a high speed with large displacement.

The support 9 functions as a bearing for reliably transmitting force of the change mechanism 8 to the transparent substrate. The support 9 is preferably a rigid material. The organic EC element 1 may be considered as one module including the organic EC element 1 to the support 9, or the support 9 may also be considered as part of an apparatus case incorporated with the organic EC element 1. The organic EC element 1 is applied with fixed pressure through the support 9 in an initial state. Since the spacer 4 is thus pressed between the pair of transparent electrodes, the internal solution is not leaked out.

Figure 4:
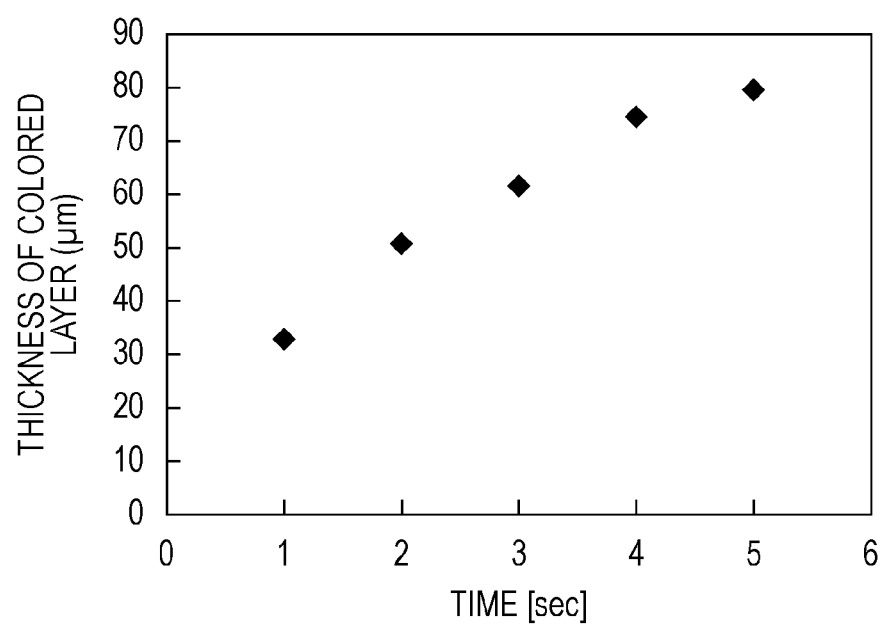
FIG. 4 is a diagram showing formation of a colored layer in the organic EC element.

A description will be given to a size of the space between the electrodes (optical path length) as the thickness of the organic EC layer, which can be taken by the organic EC element of the present invention. FIG. 4 is a diagram showing a change in thickness of a colored portion in the space between the electrodes in the process of the organic EC element coming into the colored state from the decolored state.

When a voltage is applied to the organic EC material, the oxidation or reduction reaction of the organic EC material occurs on the one-side electrode. The colored organic EC material gradually moves to the other electrode by diffusion. Therefore, the thickness of the colored portion in the space between the electrodes increases in accordance with the diffusion.

The organic EC elements of FIG. 4 is one obtained by bonding ITO transparent electrodes, respectively formed on the glass transparent substrates, to each other with 300 μm through a Teflon spacer and injecting thereinto a solution which contains the organic EC material.

As for the solution, there was used one obtained by dissolving LiClO4 (electrolyte) and ethyl viologen.dihyperchloric acid (organic EC material) in a propylene carbonate organic solvent. It is known that viologen forms radical anions from the neutral state by the reduction reaction and is colored blue. A concentration of LiClO4 was set to 0.1 M and a concentration of ethyl viologen was set to 30 mM.

The process of applying a fixed voltage to the organic EC element and coloring it was observed on a cross section of the element and a change in colored portion in the space between the electrodes with respect to time was plotted.

In the organic EC element, the colored portion expands to 80 μm in five seconds from FIG. 4. The reaction time can be made longer, and the colored portion in the space between the electrodes can be further expanded by devising the electrode structure.

Here, a case is considered where the space between the electrodes (thickness of the organic EC layer: optical path length) is set to 100 μm in the initial state of the organic EC layer. It is colored on the same conditions as in FIG. 4, and the electrochemical reaction is held in equilibrium by holding a voltage after five seconds or by other means. When the space between the electrodes (thickness of the organic EC layer: optical path length) is made smaller to 40 μm in that state, the optical density (OD) of the organic EC element is reduced by nearly a half as compared with that at the time of 100 μm in accordance with Formula (1), and the transmittance changes in accordance with the change in OD.

The timing for controlling the optical path length is not necessarily after the application of the voltage, but the timing for the control and the application can be appropriately selected, e.g., the voltage may be applied after the change in optical path length.

In the organic EC element of the present invention, the thickness of the organic EC layer is desirably not smaller than 0.1 μm and not larger than 100 μm. Further, an amount of change in thickness of the organic EC layer for controlling the optical path is desirably controllable with resolution of not larger than 1%, preferably not larger than 0.01%, of the thickness of the organic EC layer. For example, a light reduction (Neutral Density) filter capable of reducing a light amount to $1/2^n$ (n is an integer) is commercially available. The light amount can be adjusted by one organic EC element, and the element can be used for a variety of general-purpose imaging systems so long it can control the reduced light amount from $1/2$ to $1/64$.

When the thickness of the organic EC layer is 100 μm and the reduced light amount with respect to 100 μm is $1/64$, for making the reduced light amount from $1/64$ to $1/2$, the thickness of the organic EC layer may be reduced from 100 μm to 16.7 μm. The resolution of the change in thickness of the organic EC layer may be selected as appropriate in accordance with the reduced light amount.

In particular, the configuration of the present invention is effective on a problem which has occurred with a single material or a plurality of materials for the organic EC element, as follows.

First, as shown in Chem. Mater., 1992, 4, pp. 1106-1113, there exists a single material which changes an absorption spectrum in the process of coloration by the oxidation reaction. This can be seen in a case where two generated radical species form dimers. In the case of using such a material, it is difficult to control gradation (halftone) in the intermediate state.

Further, when a plurality of materials is mixed, each material has a different oxidation potential, thus causing a difference in colored state of each material depending on the applied voltage. When the applied voltage is made large for expressing dark gradation, the potential exceeds the oxidation potential in every material and coloration occurs, but when the applied voltage is made small for expressing bright gradation, there is assumed a state where the potential exceeds the oxidation potential and coloration occurs in some materials whereas the potential does not exceed the oxidation potential and coloration does not occur in some other materials.

As described above, with the configuration of the present exemplary embodiment, it is possible to control the thickness of the organic EC layer of the organic EC element and the optical path length, so as to control the gradation. Further, since it is an embodiment where only the optical path length is changed from the state of the color formed by application of the voltage before the optical path length is changed, the halftone can be favorably held without being greatly disturbed against the above problem.

Exemplary Embodiment 2

In the organic EC element of the present invention, when the space between the electrodes is made small and the thickness of the organic EC layer is made small, a buffer part, into which a solution containing the organic EC material runs, can also be formed as in the present exemplary embodiment. There will be shown an example of the organic EC element connected with the buffer part for housing a liquid or gel when the thickness of the organic EC layer made up of the liquid or the gel changes.

Figure 5:
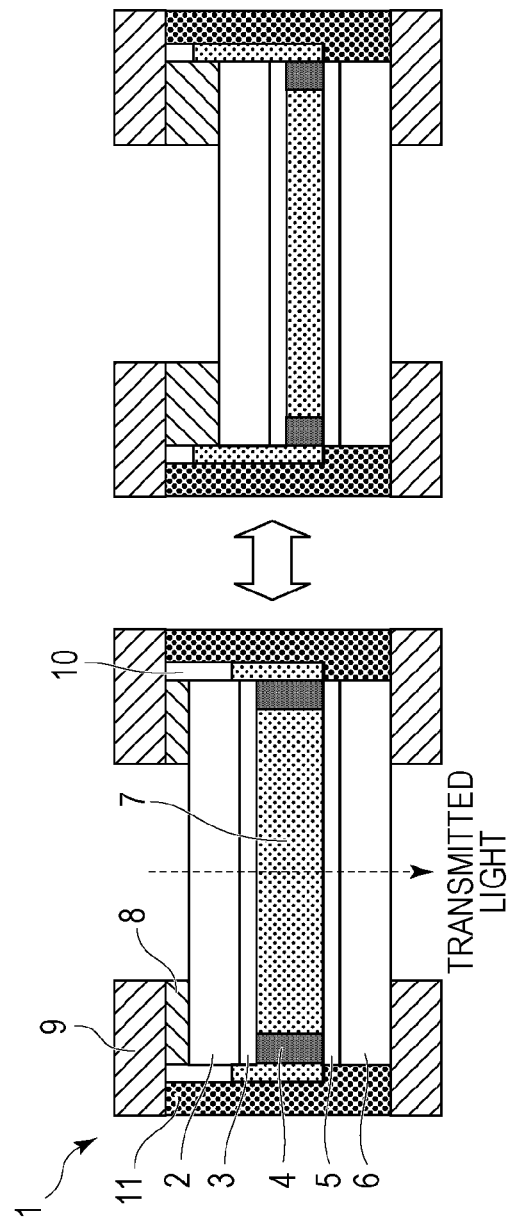
FIG. 5 is a schematic view showing another embodiment of the organic EC element of the present invention.

FIG. 5 is a schematic view showing another embodiment of the organic EC element of the present invention, as well as a schematic view showing examples of a configuration and a motion of the a buffer part 10. The buffer part 10 is an air gap portion which is in contact with the solution containing the organic EC material, and provided in an arbitrary place other than the space between the electrodes of the organic EC element 1.

In the spacer 4, there exists a space (not shown) in which the solution moves and which connects the solution containing the organic EC material and the buffer part 10.

After the organic EC element is colored and the color is elaborated, the space between the electrodes is narrowed by the change mechanism 8, and when the thickness of the organic EC layer is made small, a redundant solution runs into the buffer part 10. It is thereby possible to prevent internal pressure from rising, as compared with the case of the solution running into the space on the outer periphery which was generated due to transformation of the spacer.

While the buffer part 10 may be hermetically or non-hermetically closed, it is more preferable that it be non-hermetically closed in order to prevent damage and the like of the member caused by an excessive increase in internal pressure. When it is non-hermetically closed, the organic EC element may further have a sealing structure 11 on the outer periphery which hermetically closes itself in order to prevent water or oxygen from penetrating the buffer part. In this case, the hermetical structure is more preferably filled with inert gas such as nitrogen and argon. Further, the buffer part 10 may not be arranged between the electrodes so long as being in a place other than an area where visible light passes through.

According to the exemplary embodiment, variations in pressure inside the organic EC element can be reduced at the time of controlling the optical path length to change the space between the electrodes, and therefore it is possible to improve durability and smoothly control the optical path length.

Exemplary Embodiment 3

In the organic EC element of the present invention, as in the present exemplary embodiment, it is possible to form the change mechanism 8 between the transparent substrates 2, 6. There will be shown an example of the organic EC element in which the change mechanism is provided in the spacer, and the spacer is changed by the change mechanism to change the thickness of the EC layer.

Figure 6:
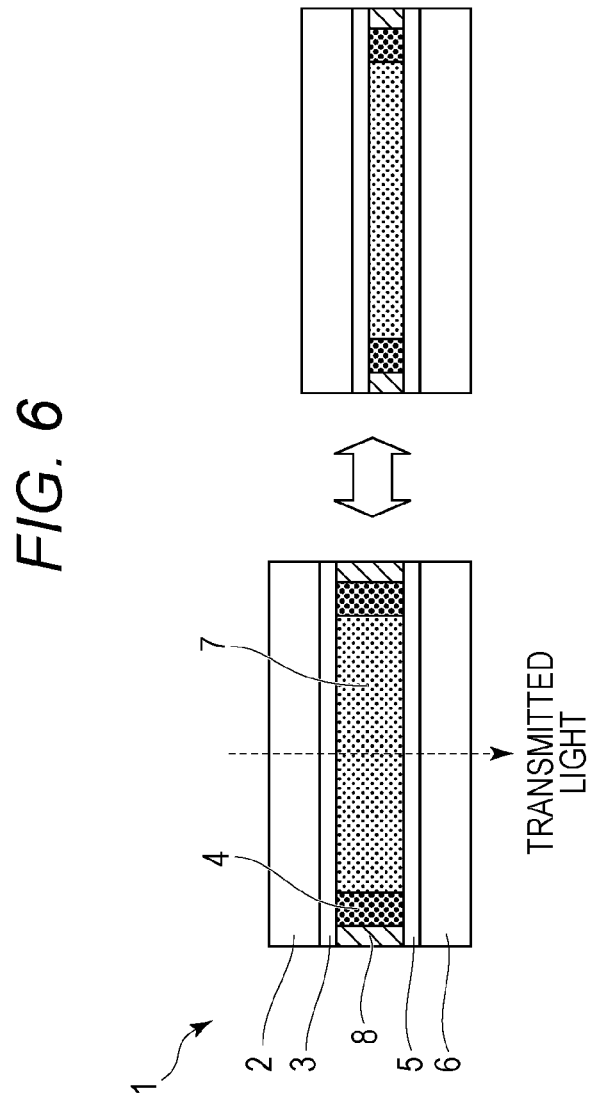
FIG. 6 is a schematic view showing another embodiment of the organic EC element of the present invention.

FIG. 6 is a schematic view showing another embodiment of the organic EC element of the present invention, and shows examples of the configuration and the motion of the organic EC element which can be used in the present embodiment.

The change mechanism 8 is arranged between the transparent electrodes 3, 5 or the transparent substrates 2, 6 in the same manner as the spacer 4. The change mechanism 8 adheres or is bonded to the transparent electrode or the transparent substrate. It transmits pulling force in the case of making the space between the electrodes small and making the thickness of the EC layer small, and it transmits pressing force in the case of making the space between the electrodes large and making the thickness of the EC layer large.

When the piezoelectric-type actuator is used as the change mechanism 8, it is possible to perform high-speed and precise control. Since the piezoelectric-type actuator has a small extension/shrinkage amount of a material and thus has a sufficient displacement amount, it is more preferably in the form of making a bending motion in a unimorph/bimorph shape and transmitting force to the space between the electrodes.

Further, the polymer actuator is also preferred since it has a large amount and large generation force of extension/shrinkage of the material itself and can thus be made smaller in size. If electric insulation against a high voltage can be ensured, the dielectric elastomer-type polymer actuator is more preferred as being operated at a high speed with large displacement.

In the case of transmitting only the pulling force to make the space between the electrodes small and then cancelling the transmission of the force to get the space between the electrodes back to the original one through use of elastic force of the spacer, the shape memory alloy and the heat-driven actuator such as bimetal can also be suitably used due to responsiveness thereof.

The change mechanism 8 may also serves as the spacer 4, and the number of members can then be reduced. Further, since two transparent substrates become fulcrums of force in the motion of the change mechanism 8, the support 9 is not required at least for the purpose of transmitting force of the change mechanism 8.

According to the embodiment of the present invention, it is possible to reduce the number of members and make the size small. Moreover, without the need for holding the outside of the substrate by the support, it is possible to enhance the degree of freedom in design.

Exemplary Embodiment 4

In the organic EC element, the organic EC layer 7 can also be used in the gel state as in the present embodiment.

The organic EC layer 7 is one obtained by further adding an appropriate amount of polymer (gelling agent) (e.g., polyvinyl bromide, etc.) to the solvent dissolved with the electrolyte and the organic EC material, and then adjusting viscosity. The organic EC layer 7 can be treated as a self-standing film holding the solution on its inside. It can be used in the embodiment of the present invention since the film thickness can be changed following the change in space between the electrodes by the motion of the change mechanism 8.

Moreover, the organic EC layer 7 can replace the function of the spacer 4 since it is the self-standing film.

Furthermore, a seal member is preferably provided since the solution may ooze to the outside with respect to the transformation, but when the viscosity is high and the solution does not ooze with respect to the motion of the change mechanism 8, the seal member is not necessarily required.

When the organic EC layer 7 is brought into the gel state, it has a problem of decreasing a response speed due to reduction in ionic conductivity, but has an advantage of suppressing a solution leakage at the time of damage.

According to the present invention, it is possible to provide an organic EC element which is excellent in handling properties and suppresses a solution leakage at the time of damage.

Exemplary Embodiment 5

In the organic EC element of the present invention, as in the present embodiment, when the state is to be returned to the decolored state, the motion of the change mechanism 8 is made to make the space between the electrodes small and make the thickness of the EC layer small, thereby allowing significant improvement in speed of decoloration.

Figure 7:
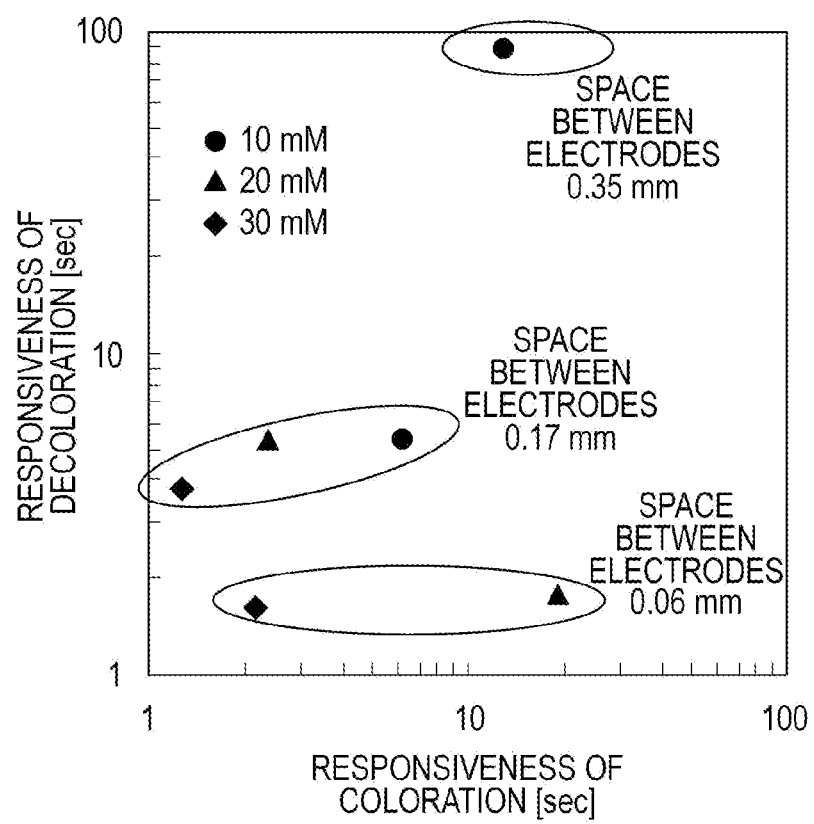
FIG. 7 is a diagram showing a decoloring speed of the organic element.

FIG. 7 is a diagram showing responsiveness of coloration and decoloration of the organic EC element in the case of changing the space between the electrodes of the organic EC element and the concentration of the organic EC material.

The organic EC elements of FIG. 7 is one obtained by bonding ITO transparent electrodes, respectively formed on the glass transparent substrates, to each other through the Teflon spacer and injecting thereinto the solution which contains the organic EC material.

A variety of elements with the respective spaces between the electrodes (thicknesses of the EC layers) being 350 μm, 170 μm and 60 μm by use of the Teflon spacers having different thicknesses.

As for the solution, one obtained by dissolving $LiClO_4$ (electrolyte) and ethyl viologen.dihyperchloric acid (organic EC material) in the propylene carbonate organic solvent was used. It is known that viologen forms radical anions from the neutral state by the reduction reaction and is colored blue.

A concentration of the electrolyte prepared was 0.1 M and a concentration of ethyl viologen prepared was 10 mM, 20 mM and 30 mM.

The responsiveness of coloration is shown by the time when the above organic EC element is applied with a fixed minus voltage exceeding a reduction potential of ethyl viologen and the optical density changes from 0 to 0.3. The responsiveness of decoloration is shown by the time when, after the coloration was performed until the optical density of 0.3, the polarity of the voltage is changed to perform the decoloring until 95% is decolored.

As for the responsiveness of coloration, at least in the elements having the same space between the electrodes (thickness of the EC layer), a tendency is shown that the higher the concentration of ethyl viologen, the faster the responsiveness. However, as for the responsiveness of decoloration, a tendency is shown that it does not greatly depend on the concentration, and the smaller the space between the electrodes (thickness of the EC layer), the faster the responsiveness. This shows that the process of decoloration is greatly related to a diffusion behavior of the organic EC material in the solution.

When the organic EC element is used as the light modulating element, a contrast ratio and a response speed need to be high.

In order to make the decoloring speed high, it is effective to make the thickness of the EC layer small. On the other hand, when the thickness of the EC layer is made small, it becomes difficult to make the optical density sufficiently high at the time of coloration due to a short optical path length. For increasing the optical density in the state of the EC layer having a small thickness, it is necessary to dissolve the organic EC material in the solvent with a high concentration and then use the obtained one, but there are limitations on the material due to the existence of materials having small solubility.

On the other hand, when the thickness of the EC layer is increased, the concentration of the material can be made low, and hence there tends not to be restrictions attributed to the solubility. However, the decoloring speed becomes low, causing insufficient responsiveness.

Against the above problem, in the present exemplary embodiment, the thickness of the EC layer is controlled so as to be made small by the motion of the change mechanism 8 in the case of bringing the organic EC element back into the decolored state.

A high contrast ratio can be realized by making the thickness of the EC layer large at the time of coloration to make the amount of change in optical density large, while the responsiveness of decoloration can be enhanced by making the thickness of the EC layer small at the time of decoloration.

As thus described, applying the mechanism of the halftone control of the present invention can lead to improvement in responsiveness of decoloration.

Exemplary Embodiment 6

In the organic EC element of the present invention, it is also possible to form a stirring bar 13 for stirring the solution containing the organic EC material accompanied by variations in space between the electrodes (thickness of the EC layer), as in the present embodiment.

Figure 8:
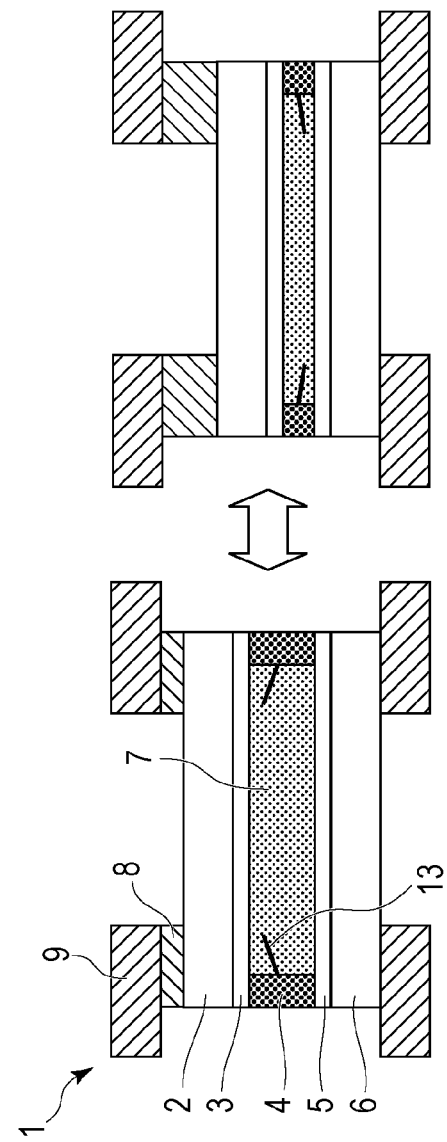
FIG. 8 is a schematic view showing another embodiment of the organic EC element of the present invention.

FIG. 8 is a schematic view showing another embodiment of the organic EC element of the present invention, and shows examples of the configuration and the motion of the organic EC element which can be used in the present embodiment. The stirring bar 13 is formed in the spacer 4. The stirring bar 13 has a structure and a function like those of a fin, for example. When the space between the electrodes varies by the motion of the change mechanism 8 to lead to a change in thickness of the EC layer and transformation of the spacer 4, the stirring bar 13 also varies so as to perform stirring in the solution.

When the motion of the change mechanism 8 is continuously made to vertically vibrate the space between the electrodes, the motion of the stirring bar 13 increases to further stir the solution. A cycle for varying the space between the electrodes is not particularly restricted, but preferably not less than 10 Hz.

The stirring by use of vibration as thus described is effectively used for improving the decoloring speed described in the fifth embodiment. With the decoloring speed depending on the diffusion behavior of the organic EC material, stirring the solution by using the embodiment of the present invention can improve the diffusivity of the organic EC material.

The stirring bar 13 may be provided not in the spacer 4 but in part of the transparent electrode or part of the transparent substrate. Further, when a similar effect is exerted by vibration of the spacer 4 itself or the transparent electrode or the transparent substrate itself, the stirring bar 13 may be regarded as being united with such a member.

When the piezoelectric-type actuator is used as the change mechanism 8, it is possible to perform high-speed and precise control. Since the piezoelectric-type actuator has a small extension/shrinkage amount of a material and thus has a sufficient displacement amount, it is more preferably in the form of making a bending motion in a unimorph/bimorph shape and transmitting force to the space between the electrodes.

Further, the polymer actuator is also preferred since it has a large amount and large generation force of extension/shrinkage of the material itself and can thus be made smaller in size. If electric insulation against a high voltage can be ensured, the dielectric elastomer-type polymer actuator is more preferred as being operated at a high speed with large displacement.

In the piezoelectric-type actuator and dielectric elastomer-type polymer actuator, a drive frequency is as high a speed as several tens of Hz to several hundreds of kHz, and is suitable for vibration stirring.

According to the embodiment of the present invention, at the time of decoloration of the organic EC element, the diffusivity of the organic EC material can be improved, thereby to allow enhancement in responsiveness of decoloration and improvement in response speed of the element.

As thus described, applying the mechanism of the halftone control of the exemplary embodiment can lead to improvement in responsiveness of decoloration.

Exemplary Embodiment 7

In the organic EC element of the present invention, the thickness of the organic EC layer can be changed by applying vibration to the organic EC element other than by controlling the space between the electrodes.

Figure 9:
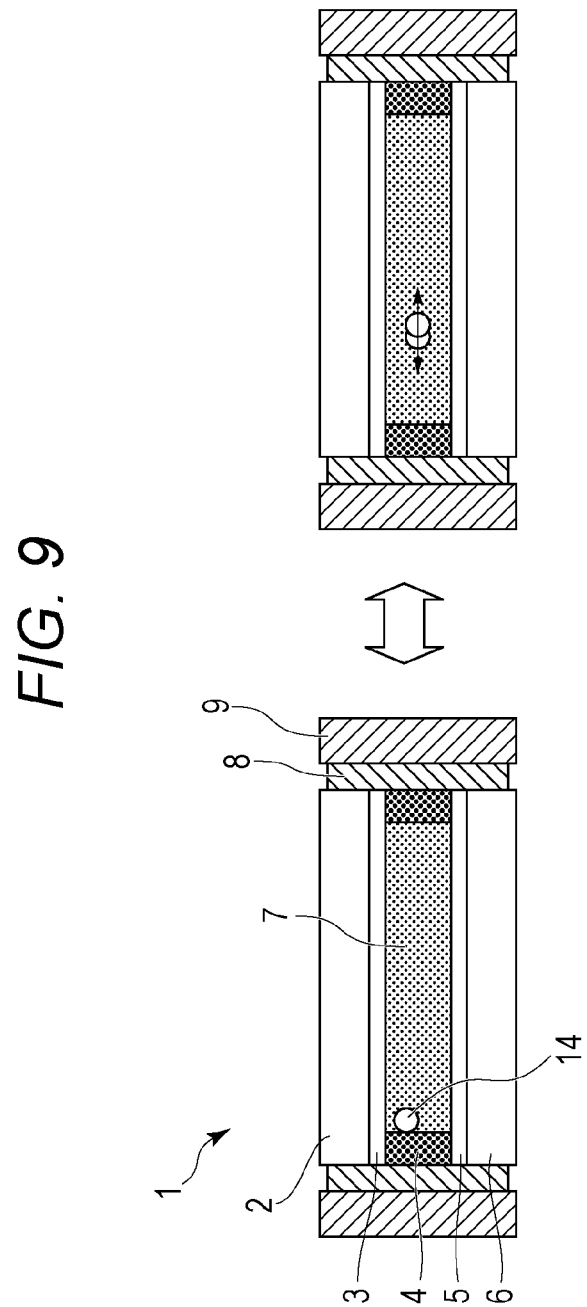
FIG. 9 is a schematic view showing another embodiment of the organic EC element of the present invention.

FIG. 9 is a schematic view showing another embodiment of the organic EC element of the present invention, and shows examples of the configuration and the motion of the organic EC element which can also be used in the present embodiment.

In the organic EC element, the change mechanism 8 is formed which applies vibration in a direction along the electrode surface of the element.

The organic EC layer 7 is a solution dissolved with the electrolyte and the organic EC material, and used as a liquid. The organic EC layer is filled in a space surrounded by the transparent electrodes 3, 5 and the spacer 4 except for part of a gaseous phase part 14. The gaseous phase part 14 normally exists in a place off the area where transmitted light passes.

When the motion of the change mechanism 8 is continuously made on the organic EC element to vibrate the element in the direction along the electrode surface, the space part 14 moves in the organic EC layer in accordance with the vibration. The thickness of the organic EC layer continuously changes to prompt stirring of the solution.

A size of the gaseous phase part 14 is not particularly restricted. The organic EC layer may vibrate with respect to the motion of the change mechanism and as a result of the vibration, the optical path length in at least some place of the organic EC layer may change.

The cycle of the vibration is not particularly restricted, but an ultrasonic wave region is preferably used.

The stirring by use of vibration as thus described is effectively used for improving the decoloring speed described in the fifth embodiment. With the decoloring speed depending on the diffusion behavior of the organic EC material, stirring the solution by using the embodiment of the present invention can improve the diffusivity of the organic EC material.

As the change mechanism 8, the piezoelectric-type actuator and dielectric elastomer-type polymer actuator has a drive frequency as high a speed as several tens of Hz to several hundreds of kHz, and is suitable for vibration stirring.

According to the embodiment of the present invention, at the time of decoloration of the organic EC element, the diffusivity of the organic EC material can be improved, thereby to allow enhancement in responsiveness of decoloration and improvement in response speed of the element.

As thus described, applying the mechanism of the halftone control of the exemplary embodiment can lead to improvement in responsiveness of decoloration.

Exemplary Embodiment 8

There will be described an embodiment in the case of constituting a light reduction (Neutral Density) filter as an optical filter using the organic EC element of the present invention.

The ND filter absorbs black, and needs uniform light absorption in the visible light region. In order to realize the black absorption by use of the organic EC material, a plurality of materials having different absorption regions in the visible light region may be mixed to make absorption flat in the visible light region. Since the absorption spectrum in the case of mixing the organic EC materials is expressed by a sum of absorption spectrums of the respective materials, the black absorption can be realized by selecting materials having appropriate wavelength regions and adjusting concentrations thereof.

A structural example of the organic EC element showing the black absorption will be described below. One obtained by forming ITO on glass can be used for the transparent substrate and the transparent electrode, and one using fluororubber as a material can be used for the spacer. Two substrate electrodes are arranged such that the ITO electrodes are opposed to each other through the spacer. The spacer has elasticity, and when pressed by the two substrate electrodes, it is compressively transformed. Further, there exists a hole in part of the spacer, and it is connected to a buffer part having an air gap not filled with the solution.

The organic EC layer expressing black absorption is injected into the space surrounded by the substrate electrodes and the spacer. The organic EC layer is one obtained by dissolving a plurality of organic EC materials and an electrolyte in an organic solvent. Wavelength ranges and concentrations of the plurality of organic EC materials are appropriately adjusted so as to express the black absorption.

A mechanical mechanism such as a stepper motor can be used as the change mechanism for changing the thickness of the organic EC element. It has a structure where an axis is sent out by rotation of the motor, the axial presses the transparent substrate of the organic EC element. Since a displacement amount can be controlled by the number of revolution of the motor, it is possible to accurately control the change in thickness of the organic EC element. Further, an actuator using generation of distortion of a material itself, such as the piezoelectric actuator, the polymer actuator or the shape memory alloy, can also be used.

There will be shown below an example of drive of the ND filter in combination of the organic EC element and the change mechanism. In general, a light amount of the ND filter is set to $1/2^n$ (n is an integer). With $1/2$, the transmittance changes from 100% to 50%, and with $1/4$, it changes from 100% to 25%. Further, with the transmittance of $1/2$, a change amount $\Delta OD$ of the optical density is 0.3 from Formula (1), and with the transmittance of $1/4$, $\Delta OD$ is 0.6. When light is reduced from $1/2$ to $1/64$, $\Delta OD$ may be controlled from 0.3 to 1.8 at an interval of 0.3. When the thickness of the spacer is set to 100 μm, coloration of the organic EC element reaches 80 μm in several seconds with respect to a direction of the thickness of the element, as shown in FIG. 4. Assuming the change amount $\Delta OD$ of the optical density at this time is 1.8, the organic EC element can reduce light into $1/64$ in the thickness of 100 μm. Assuming the thickness of 80 μm is considered as a thickness of the colored layer, when the thickness of the organic EC element is controlled from 100 μm to 66.7 μm, 53.3 μm, 40 μm, 26.7 μm and 13.3 μm, $\Delta OD$ and the reduced light amount can generally be adjusted respectively to 1.5 ($1/32$), 1.2 ($1/16$), 0.9 ($1/8$), 0.6 ($1/4$) and 0.3 ($1/2$). With the organic EC material being the solution, the above includes variations in colored amount attributed to fluctuation. For accurate control, an external monitor for measuring a light amount may be attached.

In the optical filter having the organic EC element and the active element connected to the organic EC element as described above, it is possible to accurately control the gradation.

Such an optical filter may be used in an image pickup apparatus such as a camera. When used in the image pickup apparatus, the optical filter may be provided in a body of the image pickup apparatus or in its lens unit.

Exemplary Embodiment 9

There will be described an embodiment of an image pickup apparatus and a lens unit which use the optical filter of the present invention.

Figure 10:
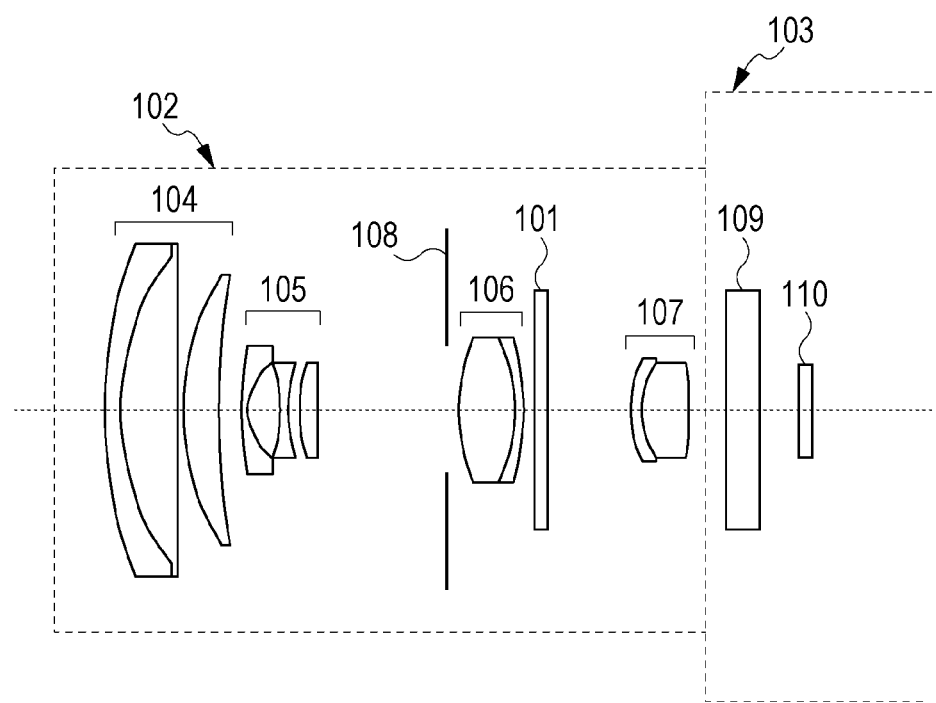
FIG. 10 is a schematic view showing a lens unit using an optical filter of the present invention, and an image pickup apparatus having the lens unit.

FIG. 10 is a schematic view showing a lens unit using the optical filter of the present invention, and an image pickup apparatus having the lens unit.

An optical filter 101 has the organic EC element and the active element connected to the organic EC element, and is arranged in a lens unit 102.

The lens unit 102 is a unit having a plurality of lenses or a lens group. For example, in FIG. 10, the lens unit represents a rear-focus type zoom lens which performs focusing behind an aperture diaphragm. It has four lens groups which are, in the sequential order from the object side, a first lens group 104 of positive refracting power, a second lens group 105 of negative refracting power, a third lens group 106 of positive refracting power, and a fourth lens group 107 of positive refracting power. A space between the second group and the third group is changed for variable magnification, and part of the fourth lens group is moved to perform focusing.

The lens unit 102 has an aperture diaphragm 108 between the second group and the third group, and has the optical filter 101 between the third group and the fourth group.

The arrangement is made such that light to pass through the lens unit passes through the lens group, the aperture diaphragm and the optical filter, and a light amount can be adjusted by use of the aperture diaphragm and the optical filter.

Further, the configuration in the lens unit can be appropriately changed. For example, the optical filter can be arranged in front of or behind the aperture diaphragm, and may be arranged in front (on the object side) of the first group, or may be arranged behind the fourth group. There are advantages such as being able to make an area of the optical filter small when it is arranged in a position where light is converged.

Further, the form of the lens unit can be appropriately selected, and other than the rear-focus type, it may be an inner-focus type which performs focusing in front of the diaphragm, or some other type. Further, a special lens such as a fisheye lens or a micro lens can also be selected appropriately.

The lens unit is mountably/removably connected to an image pickup apparatus 103 through a mount member (not shown).

A glass block 109 is a glass block such as a low-pass filter, a face plate or a color filter.

Further, a light receiving element 110 is a sensor part which receives light having passed through the lens unit, and an image pickup device such as a CCD or a CMOS can be used. Moreover, it may be a photosensor such as a photodiode, and one that acquires and outputs information of an intensity or a wavelength of light can be appropriately used.

When the optical filter is incorporated in the lens unit as shown in FIG. 10, it is not necessarily required to bond the vibration mechanism to the electrochromic element used as the optical filter, and for example, an actuator mechanism used for the motion of the lens unit is applicable to the optical filter. An electromagnetic or an ultrasonic motor may be used for movement of the lens group. When vibration of the motor is applied to the optical filter, it is possible to exert a stirring function on the solution as the organic EC layer described in Examples 6 and 7 and especially enhance the responsiveness of decoloration, so as to improve the response speed of the element.

Figure 11:
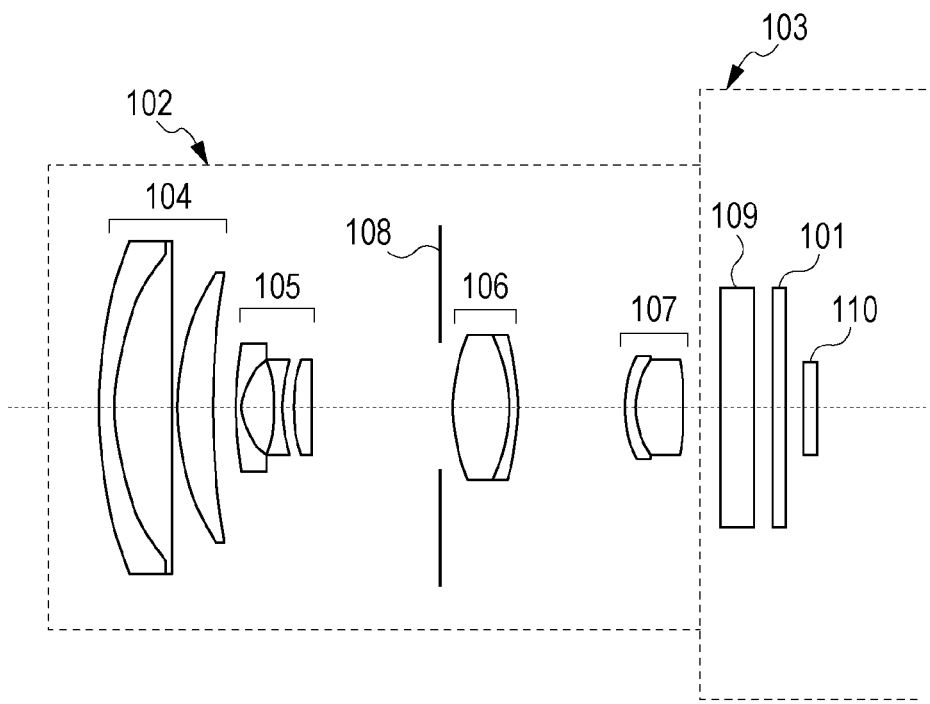

Further, the image pickup apparatus itself may have the optical filter 101. FIG. 11 is a schematic view of the image pickup apparatus having the optical filter.

The optical filter may only be arranged in an appropriate place inside the image pickup apparatus, and the light receiving element 110 may only be arranged so as to receive light having passed through the optical filter. In FIG. 11, for example, the optical filter is arranged immediately in front of the light receiving element. When the image pickup apparatus itself has the optical filter built-in, the connected lens unit itself may not have the optical filter, thereby allowing a configuration of an image pickup apparatus capable of modulating light by use of the existing lens unit.

Such an image pickup apparatus is applicable to a product having a light amount modulator and a light receiving element in combination. For example, it is usable in a camera, a digital camera, a video camera and a digital video camera, and is also applicable to a product having an image pickup apparatus built-in, such as a mobile phone, a smart phone, a PC or a tablet computer.

By using the optical filter made up of the organic EC element as the light modulating member as in the present embodiment, an adjusted light amount can be appropriately varied by one filter, and there are thus advantages of reducing the number of members and saving a space. Further, by using the optical filter disclosed in the present invention, it is possible to have advantages of controlling the halftone and improving responsiveness.

Since the electrochromic element of the present invention can readily control gradation, it can be used in an optical filter, and especially in a light reduction (ND) filter for camera.

According to the present invention, it is possible to provide an electrochromic element which can readily control gradation, a method for driving the same, and an optical filter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274538, filed Dec. 17, 2012, and Japanese Patent Application No. 2013-212294, filed Oct. 9, 2013 which are hereby incorporated by reference herein in their entirety.

What is claimed is:

1. An electrochromic element comprising:
a pair of electrodes;
an electrochromic layer provided between the pair of electrodes and having an electrolyte and an electrochromic material, the electrochromic layer being a liquid or gel; and
a flexible member configured to be arranged between the pair of electrodes,
the electrochromic element having a change mechanism configured to change a distance between the pair of electrodes,
wherein the electrochromic layer is connected with a buffer part for housing a redundant liquid or gel in a case where the thickness of the electrochromic layer made up of the liquid or the gel changes.

2. The electrochromic element according to claim 1, wherein the flexible member is provided so as to surround a periphery of the electrochromic layer.

3. The electrochromic element according to claim 1, wherein
the change mechanism is provided on a transparent substrate formed outside at least one electrode, and
a distance between the pair of electrodes is changed by the change mechanism, to change the thickness of the electrochromic layer.

4. The electrochromic element according to claim 1, wherein
the change mechanism is provided on the flexible member, and
the flexible member is changed by the change mechanism, to change the thickness of the electrochromic layer.

5. The electrochromic element according to claim 1, wherein the change mechanism is an actuator.

6. The electrochromic element according to claim 1, wherein the electrochromic layer has a plurality of kinds of electrochromic materials.

7. The electrochromic element according to claim 1, wherein the thickness of the electrochromic layer is changed, to control a light transmittance of the electrochromic element.

8. An optical filter comprising:
the electrochromic element according to claim 1; and
an active element configured to be connected to the electrochromic element.

9. An image pickup apparatus comprising:
the optical filter according to claim 8; and
a light receiving element for receiving light having passed through the optical filter.

10. A lens unit comprising:
the optical filter according to claim 8; and
an optical system configured to have a plurality of lenses.

11. A method for driving an electrochromic element having a pair of electrodes, and an electrochromic layer configured to have an electrolyte and an electrochromic material between the pair of electrodes, the electrochromic layer being a liquid or gel, and the element having a change mechanism configured to change a distance between the pair of electrodes,
wherein the distance between the pair of electrodes is changed by the change mechanism, to change a transmittance of the electrochromic element, and
wherein the electrochromic layer is connected with a buffer part for housing a redundant liquid or gel in a case where the thickness of the electrochromic layer made UP of the liquid or the gel changes.

12. The method for driving the electrochromic element according to claim 11, wherein a distance between the pair of electrodes is repeatedly varied by the change mechanism with a frequency of not less than 10 Hz.

13. The method for driving the electrochromic element according to claim 11, wherein the electrochromic element is repeatedly vibrated by the change mechanism with a frequency of not less than 10 Hz, to change the thickness of the electrochromic layer.

* * * * *